US006538752B2

(12) United States Patent
Gardner, Jr. et al.

(10) Patent No.: US 6,538,752 B2
(45) Date of Patent: Mar. 25, 2003

(54) SYSTEM AND METHOD FOR POSITIONING A COMPONENT USING FEEDBACK

(75) Inventors: Richard Lynn Gardner, Jr., Greeley, CO (US); Paul C Coffin, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/860,062

(22) Filed: May 17, 2001

(65) Prior Publication Data

US 2002/0171053 A1 Nov. 21, 2002

(51) Int. Cl.[7] .......................... G01B 11/14; G11B 15/68
(52) U.S. Cl. ......................................... 356/614; 360/92
(58) Field of Search .............................. 360/92; 356/614

(56) References Cited

U.S. PATENT DOCUMENTS

| | | | |
|---|---|---|---|
| 5,682,096 A | | 10/1997 | Christie, Jr. ............. 324/207.2 |
| 5,790,338 A | * | 8/1998 | Kanai et al. .................. 360/92 |
| 5,895,157 A | * | 4/1999 | Morimura et al. .......... 271/9.05 |
| 5,946,160 A | * | 8/1999 | Ohashi .......................... 360/92 |
| 6,160,678 A | * | 12/2000 | Meikle et al. ................. 360/92 |
| 6,219,313 B1 | * | 4/2001 | Ries et al. ................ 369/30.31 |
| 6,239,941 B1 | * | 5/2001 | Small ........................... 360/92 |
| 6,290,072 B1 | * | 9/2001 | Utsumi et al. ................ 360/92 |

* cited by examiner

Primary Examiner—John R. Lee
Assistant Examiner—Johnnie L Smith, II

(57) ABSTRACT

The present invention is directed to a system and method which utilize a feedback loop arrangement to control the accurate positioning of components. The system and method may utilize the feedback loop to control a component engaging member operable to retrieve a component. The feedback loop may control the component engaging member by activating a drive subsystem operable to translate the component engaging member. Additionally, the feedback control loop may implemented by utilizing a signal source operable to emit a signal and a signal receiver operable to receive the signal emitted by the signal source. The signal source and signal receiver are fixedly attached to the device. Also, the feedback loop may involve a processor operable to control retrieval of a desired component utilizing at least in part the signal emitted by the signal source and received by the signal receiver.

18 Claims, 3 Drawing Sheets

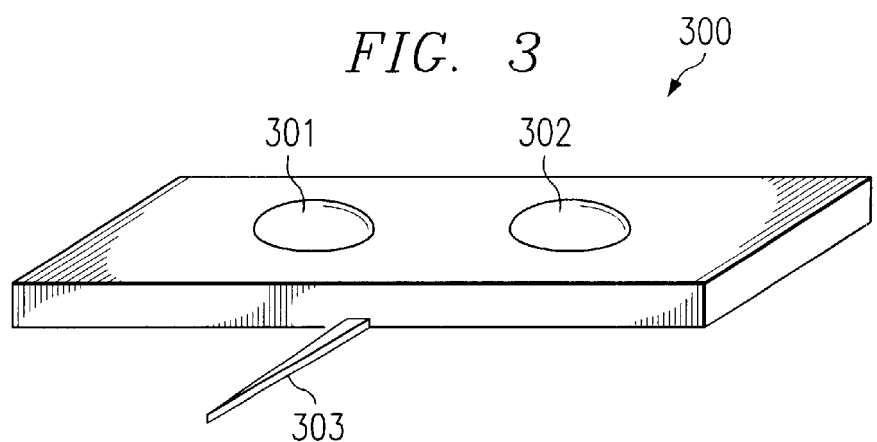
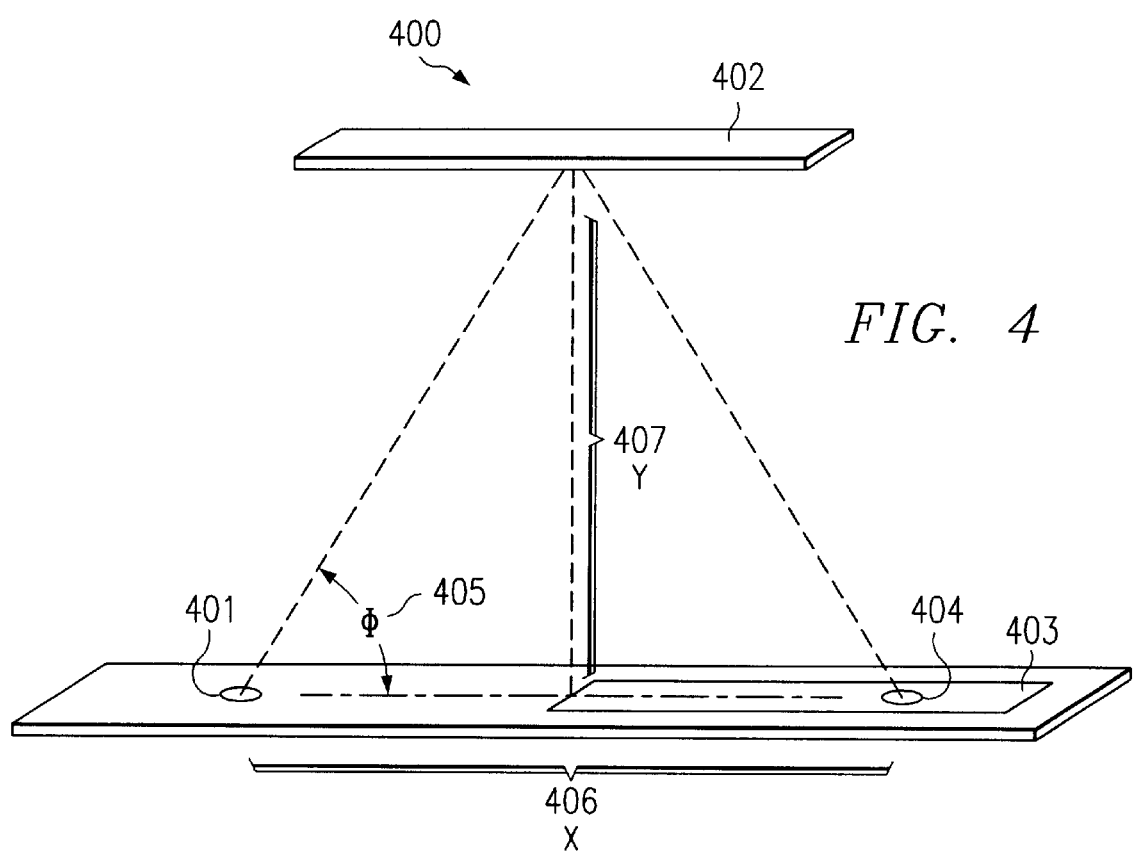

SYSTEM AND METHOD FOR POSITIONING A COMPONENT USING FEEDBACK

BACKGROUND

Mass storage devices frequently require a number of sometimes diverse media to store a sufficient amount of data for certain applications. For example, corporate entities may create libraries of optical media and magnetic media to retain imaging files of purchase orders, invoices, and other forms for accounting purposes. To maintain such a library or other large data collections, it is frequently appropriate to utilize a media autochanger. Media autochangers provide a unitary structure to store a plurality of such diverse media, such as optical media, magnetic disks, tape cartridges, and/or the like. Media autochangers store the media in predefined locations within the unitary structure.

In operation, a media autochanger typically utilizes a drive unit and an associated drive train to physically move a media engaging component to the predetermined location associated with a media storage position when retrieval of the media is desired. After being translated to the appropriate position, the media engaging component may extend from a drive position to an engage position to retrieve the media. The media engaging component then retracts. The media engaging component with the retrieved media is transported to a media drive. Again, the media engaging component extends to place the media into the media drive. Of course, the reverse of this process occurs when it is desired to replace the media to its respective predetermined position.

It shall be appreciated that the steps associated with retrieving and replacing media require significant mechanical precision. Specifically, imprecise positioning may damage media or may cause the media autochanger to cease functioning. To properly position the media engaging component, media autochangers utilize a drive train feedback arrangement. In these configurations, various encoding mechanisms allow the media autochanger to determine how the drive train has been translated. By knowing the offset or translation of the drive train, the media autochanger may then estimate the position of the media engaging component. However, this approach is problematic. Specifically, physical characteristics of mechanical components frequently change with time. For example, the drive train may slip. Thus, the offset or translation of the drive train does not necessarily provide a completely accurate determination of the position of the media engaging component.

SUMMARY OF THE INVENTION

The present invention is directed to a system and method which utilize a feedback loop arrangement to control the accurate positioning of components. The system and method may utilize the feedback loop to control a component engaging member operable to retrieve a component. The feedback loop may control the component engaging member by activating a drive subsystem operable to translate the component engaging member. Additionally, the feedback control loop may implemented by utilizing a signal source operable to emit a signal and a signal receiver operable to receive the signal emitted by the signal source. The signal source and signal receiver are fixedly attached to the device. Also, the feedback loop may involve a processor operable to control retrieval of a desired component utilizing at least in part the signal emitted by the signal source and received by the signal receiver.

BRIEF DESCRIPTION OF THE DRAWINGS

FIG. 3 depicts an exemplary ultrasonic transmitter and receiver pair implemented according to the present invention.

FIG. 4 depicts an exemplary optical transmitter and receiver pair implemented according to the present invention.

DETAILED DESCRIPTION

Figure 1:
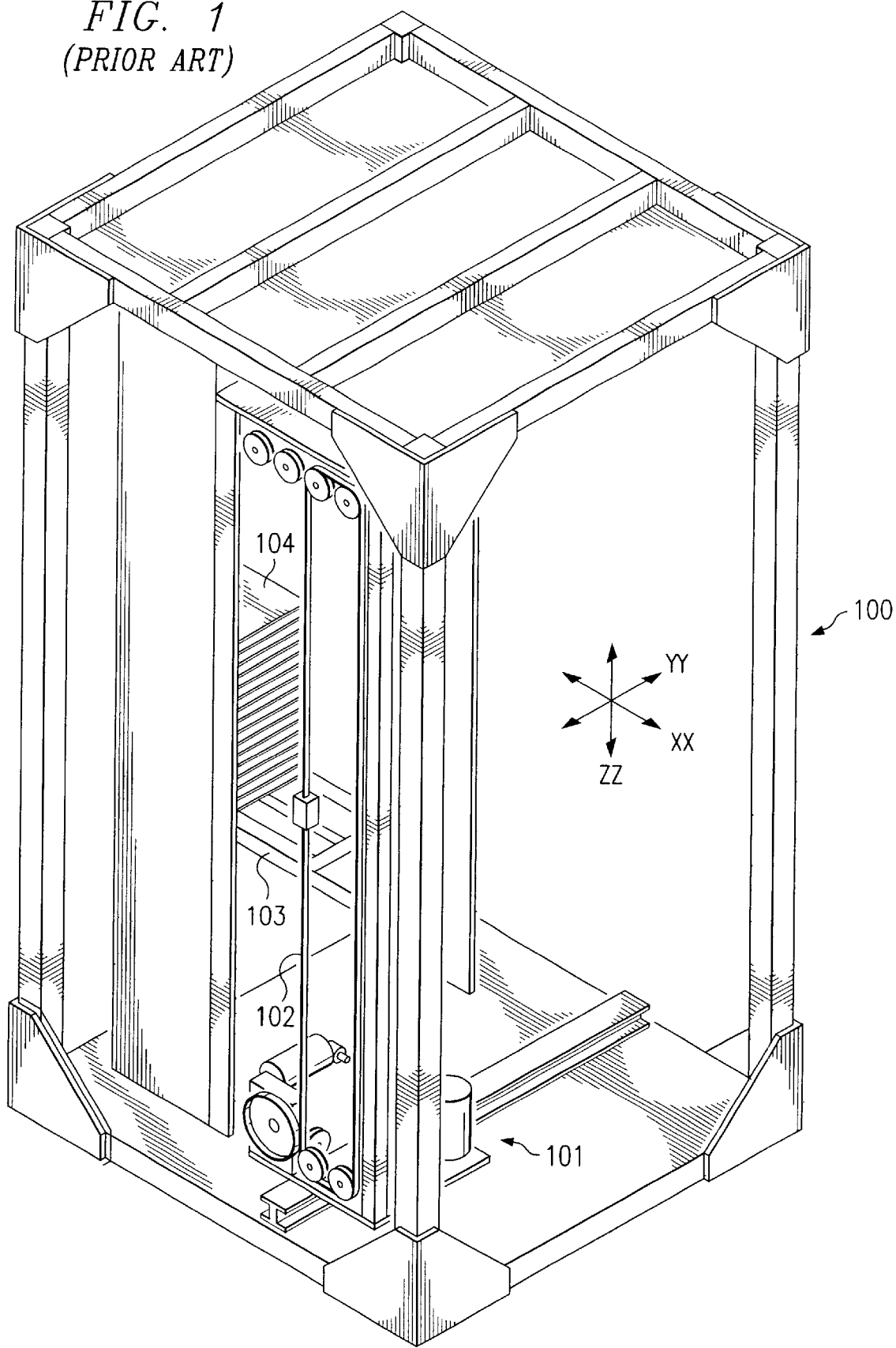
FIG. 1 depicts an exemplary media autochanger implemented according to the prior art.

FIG. 1 depicts a prior art device where components such as media disks, tapes, and/or the like must be accurately positioned. In our example, the device is a media autochanger implemented according to the prior art. Media autochanger 100 includes a chassis holding a number of elements. The chassis holds drive unit 101, drive train 102, media engaging component 103, and media holders 104.

Media holders 104 are fixedly disposed in predetermined positions on one side of the chassis along the Z-axis. When a particular media is needed, media autochanger 100 causes media engaging component 103 to be translated to the respective position. Media engaging component 103 extends along the X-axis to retrieve the needed media from its media holder.

Drive unit 101 provides the necessary mechanical translation to position media engaging component 103 in the desired positions associated with media holders 104. Drive unit 101 physically translates media engaging component 103 by utilizing its motor to translate drive train 102 either in a forward direction or a backward direction. Media engaging component 103 is mechanically coupled to drive train 102. Accordingly, translation of drive train 102 causes media engaging component 103 to be translated. Also, media autochanger 100 utilizes the offset position of drive train 102 to estimate the position of media engaging component 103. Specifically, media autochanger 100 associates encoders with drive train 102. The encoders may be provided in mechanical form or electronic form. The encoders allow media autochanger 100 to determine the offset position of drive train 102. If drive train 102 is detected to be translated a distance X from a known position, the position of media engaging component 103 may be estimated to be a distance X from another known position. However, this does not necessarily provide a completely accurate estimation of the position of media engaging component 103, since the characteristics of drive train 102 may change with time.

Figure 2:
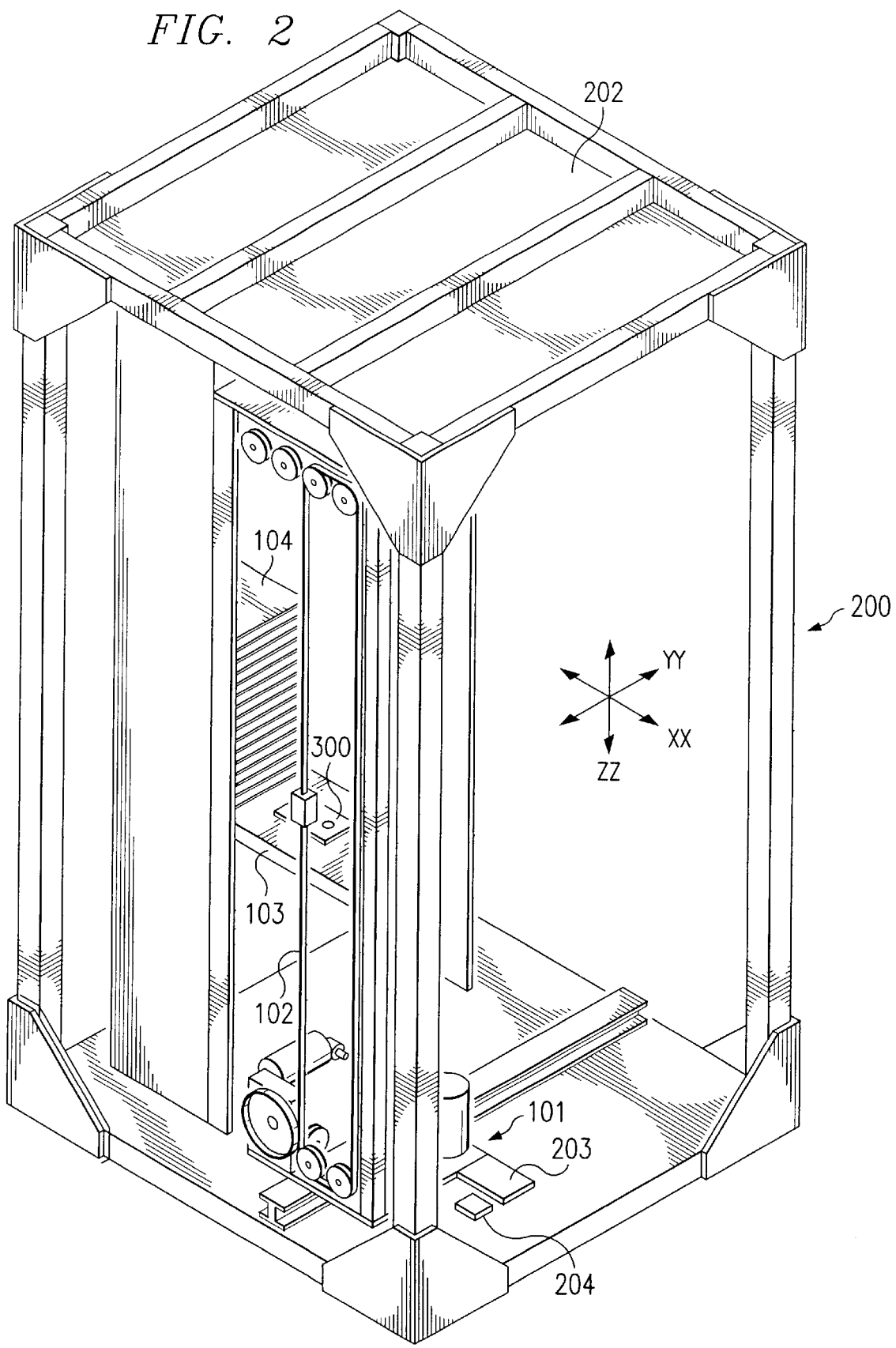
FIG. 2 depicts an exemplary media autochanger implemented according to the present invention.

FIG. 2 depicts an exemplary media autochanger implemented according to the present invention. Media autochanger 200 includes a chassis holding a number of elements. The chassis holds drive unit 101, drive train 102, media engaging component 103, and media holders 104. Media autochanger 200 further includes processor 203 and temperature sensor 204. Also, transmitter and receiver pair 300 is fixedly attached to media engaging component 103. Processor 203 communicates with transmitter and receiver pair 300.

As seen with respect to media autochanger 100 of FIG. 1, media holders 104 of media autochanger 200 are fixedly disposed in predetermined positions on one side of the chassis along the Z-axis. When a particular media is needed, media autochanger 200 causes media engaging component 103 to be translated to the respective position. Media engaging component 103 extends along the X-axis to retrieve the needed media from its media holder.

Drive unit 101 provides the necessary mechanical translation to position media engaging component 103 in the desired positions associated with media holders 104. Drive unit 101 physically translates media engaging component 103 by utilizing its motor to translate drive train 102 either in a forward direction or a backward direction. Media engaging component 103 is mechanically coupled to drive train 102. Accordingly, translation of drive train 102 causes media engaging component 103 to be translated.

Media autochanger 200 provides a substantially more accurate mechanism to determine the position of media engaging component 103. Media autochanger 200 is implemented to utilize transmitter and receiver pair 300 to provide a feedback arrangement. In accordance with one embodiment of the present invention, the feedback arrangement may be implemented utilizing an ultrasonic signal. However, the present invention is not limited to any particular signal or waveform type. Any signal or waveform type may be utilized, so long as the signal or waveform type facilitates measurement of distance.

According to an ultrasonic embodiment, processor 203 causes transmitter and receiver pair 300 to emit an ultrasonic signal. The ultrasonic signal propagates from transmitter and receiver pair 300 toward chassis ceiling 202. Chassis ceiling 202 causes the ultrasonic signal to be reflected back toward transmitter and receiver pair 300. Processor 203 determines when the reflected ultrasonic signal is detected by the receiver portion of transmitter and receiver pair 300. Processor 203 is then able to calculate the propagation time for the ultrasonic signal to propagate from transmitter and receiver pair 300 to chassis ceiling 202 and back again.

Processor 203 also utilizes temperature sensor 204 to detect the ambient air temperature. Processor 203 then is able to calculate the distance from transmitter and receiver pair 300 to chassis ceiling 202. Specifically, the distance in meters approximately equals:

(The Measured Propagation Time in Seconds)/2*(331.5+.6*$T_c$ Meters/Second)

where $T_c$ represents the ambient air temperature. The factor of 2 in the denominator reflects the fact that the propagation of the ultrasonic signal occurs to chassis ceiling 202 and back. Thus, the ultrasonic signal travels twice the offset distance before being detected by the receiver of transmitter and receiver pair 300. Also, it shall be appreciated that $T_c$ may be neglected if a certain amount of positioning tolerance exists or if media autochanger 200 is operated in a controlled environment.

After calculating the position of transmitter and receiver pair 300, processor 203 calculates the exact position of media engaging component 103. The exact position of media engaging component 103 is readily calculable, since media engaging component 103 and transmitter and receiver pair 300 are fixedly attached. Moreover, this type of mechanical arrangement is unlikely to vary with time or excessive use. Thus, the position calculation utilizing the present invention will remain accurate over the useable life of media autochanger 200.

Since the exact position of the media engaging component 103 has been calculated, processor 203 compares the position to the respective predetermined position associated with the desired media. If the positions are not equal, processor 203 may control drive unit 101 to effect drive train 102 to translate media engaging component 103 as appropriate. Thus, accurate positioning has been effected utilizing a control signal feedback loop.

It shall be appreciated that the present invention may be practiced with any type of media autochangers which may utilize any number of arrangements, configurations, components, and devices. Specifically, the present invention may dispose transmitter and receiver pair 300 in any number of locations. For example, transmitter and receiver pair 300 may be located on chassis ceiling 202 directly above media engaging component 103. Additionally, an optical feedback arrangement may be employed by measuring the angle of displacement of an optical signal reflected by a mirror disposed on chassis ceiling 105. The feedback loop may be implemented utilizing components other than a processor. For example, integrated circuitry may provide the desired feedback loop functionality. Moreover, it shall be appreciated that media autochanger 200 is merely exemplary. The present invention may be employed with any media autochanger. The present invention does not require any particular drive unit, drive train, type of media engaging components, or number of media engaging units, and/or the like. Also, the present invention may operate on any number of media types including, but not limited, to CD-ROMs, DVDs, magnetic disk media, tape media, and/or the like.

FIG. 3 depicts an exemplary transmitter and receiver pair implemented according to the present invention. Transmitter and receiver pair 300 comprises transmitter 301 which is operable to emit an ultrasonic signal. For example, transmitter 301 may emit a baseband signal modulated by an ultrasonic carrier signal of approximately 40 KHz. Of course, other carrier frequencies may be utilized. Also, transmitter 301 may emit an unmodulated carrier signal if desired. Transmitter and receiver pair 300 comprises a receiver 302 which is operable to detect an ultrasonic signal. Transmitter and receiver pair 300 comprises connection 303 which facilitates communication with and control by processor 203.

FIG. 4 depicts another arrangement 400 of components according to the present invention. Feedback arrangement 400 includes light source 401 (e.g., a light emitting diode), mirror 402 which may be mounted on the ceiling, and optical detector 403. Light source 401 emits a light signal at angle Ø. The light signal is reflected by mirror 402 toward optical detector 403 (such as a charge coupled device (CCD)). The light signal is received at point 404 on optical detector 403. Point 404 is a distance X from light source 405. The geometry of feedback arrangement allows the offset position to be readily determined. Specifically, the distance to the mirror equals: (distance X )* ½* tan (angleØ).

It shall be appreciated that an actual implementation of a media autochanger would comprise substantially more components, elements, and devices. The preceding high level description has been provided to clarify the discussion of the present invention. Discussion of other implementation details of media autochangers is not necessary for those of ordinary skill in the art to make and use the present invention. Therefore, those details have not be discussed at length. However, further details regarding implementation of other aspects of media autochangers may be founded in U.S. Pat. No. 5,682,096, entitled "METHOD AND APPARATUS FOR MONITORING OPERATING POSITIONS OF A MEDIA AUTOCHANGER."

Additionally, it shall be appreciated that the present invention provides substantial advantages over known autochangers. The precision of positioning does not deteriorate with time or with excessive use. Specifically, the present invention is not subject to variations in drive train characteristics such as slippage or material deformation. The present invention is much more reliable, since fixedly attaching the ultrasonic transmitter and receiver pair to the media engaging component is much more stable than drive train methods.

What is claimed is:

1. A device for storing a plurality of components, said device comprising:

a component engaging member operable to retrieve a component;

a drive subsystem operable to translate said component engaging member;

a signal source operable to emit a signal, wherein said signal source emits a signal to be reflected by a chassis;

a signal receiver operable to receive the signal emitted by said signal source, wherein said signal source and signal receiver are fixedly attached to said device; and a processor operable to control retrieval of a desired component of said plurality of components by controlling said drive subsystem utilizing a feedback loop controlled at least in part by the signal emitted by said signal source and received by said signal receiver.

2. The device of claim 1 wherein said signal source is an ultrasonic transmitter and wherein said signal receiver is an ultrasonic receiver.

3. The device of claim 1 wherein said signal source and said signal receiver are disposed on said component engaging member.

4. The device of claim 1 wherein said processor determines a position of said component engaging component by measuring time between emission of said signal and reception of said signal to generate a measured time and dividing the measured time by two times the speed of sound.

5. The device of claim 1 wherein said signal source is a light source and said signal receiver is an optical detector.

6. The device of claim 5 wherein said signal is emitted at an emission angle, wherein said signal is received at a distance from said signal source, and wherein said processor determines a position of said component engaging component by multiplying the distance by one half the tangent of the emission angle.

7. The device of claim 1 wherein said component includes media.

8. A method for retrieving a desired media of a plurality of media in a media autochanger, comprising:

(a) fixedly disposing a transmitter and a receiver on said media autochanger;

(b) emitting a signal from said transmitter, wherein said transmitter emits the signal to be reflected by a chassis;

(c) receiving said signal at said receiver;

(d) determining by transmission between said transmitter and said receiver a position associated with a media engaging component of said media autochanger to generate a determined position;

(e) comparing said determined position with a location associated with said desired media;

(f) when said determined position is incorrect, moving said media engaging component; and (g) repeating steps (b) through (f) until said determined position is correct.

9. The method of claim 8 wherein said transmitter is an ultrasonic transmitter.

10. The method of claim 8 wherein said transmitter is disposed on said media engaging member.

11. The method of claim 8 wherein step (d) includes the sub-steps of:

measuring time between emission of said signal and reception of said signal to generate a measured time; and dividing the measured time by two times the speed of sound.

12. The method of claim 8 wherein said transmitter is a light source and said receiver is an optical detector.

13. The method of claim 8 wherein said signal is an optical signal emitted at an emission angle, wherein said signal is received at a determined distance from said signal source, and wherein step (d) includes the sub-step of:

multiplying the determined distance by one half the tangent of the emission angle.

14. A media autochanger for storing a plurality of media, comprising:

at least one drive unit for translating a media engaging component;

means for creating a feedback signal associated with the position of said media engaging component, wherein said means for creating feedback emits a signal that is reflected by a chassis for reception by said means for creating feedback; and means for processing said feedback signal to control said drive unit in response to said feedback signal.

15. The media autochanger of claim 14 wherein said means for creating a feedback signal includes an ultrasonic transmitter and an ultrasonic receiver.

16. The media autochanger of claim 14 wherein said means for creating a feedback signal includes a light source and an optical detector.

17. The media autochanger of claim 14 wherein said means for processing includes a processor.

18. The media autochanger of claim 14 wherein said means for processing includes an integrated circuit.

* * * * *